Feb. 16, 1932.    G. G. WAITE    1,845,534
CONDENSER TOTALIZER FOR REMOTE METERING SYSTEMS
Filed Nov. 19, 1927

INVENTOR
Griffin G. Waite.
BY
ATTORNEY

Patented Feb. 16, 1932

1,845,534

UNITED STATES PATENT OFFICE

GRIFFIN G. WAITE, OF TORONTO, ONTARIO, CANADA, ASSIGNOR TO WESTINGHOUSE ELECTRIC & MANUFACTURING COMPANY, A CORPORATION OF PENNSYLVANIA

CONDENSER TOTALIZER FOR REMOTE METERING SYSTEMS

Application filed November 19, 1927. Serial No. 234,440.

My invention is concerned with remote metering systems and more particularly with the means employed in such systems for totalizing or summing the readings of a plurality of meters.

The principal object of my invention is to provide means for totalizing the readings of a number of meters.

Another object of my invention is to utilize a plurality of condensers adapted to be charged periodically by the measuring devices and discharged successively through a totalizing device.

A further object of my invention is to provide a totalizing system which shall be positive and reliable in operation as well as inexpensive to manufacture.

Remote metering systems operated by impulse trains are now well known. In these systems, impulses are transmitted from a distant meter to a central station at a rate proportional to the quantity measured by the meter. Suitable receiving apparatus is provided for registering the impulses as received.

It is often desirable, in such systems, that the readings of a plurality of meters be totalized on a single instrument. My invention provides means for accomplishing this object.

Figure 1:
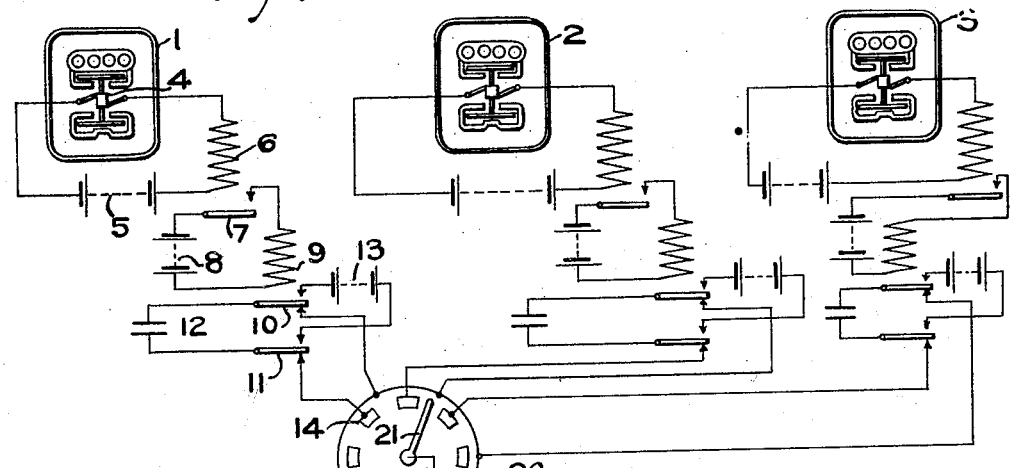
Figure 2:
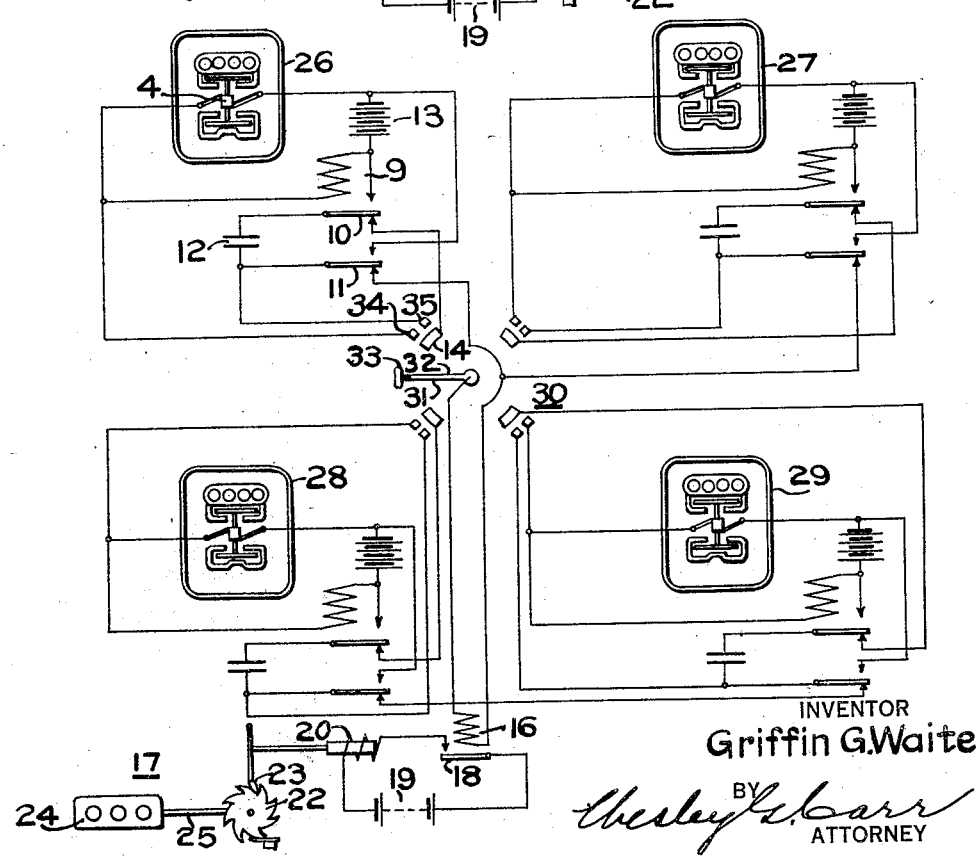

My invention may be more completely understood by reference to the accompanying drawings, in which Figure 1 is a diagram of a measuring system employing the principles of my invention, and Fig. 2 is a diagram of a modified system including an improvement thereon.

In Fig. 1, 1, 2 and 3 represent watthour-meter impulse senders which are well known in the art and consist merely of a standard watthour meter having a commutator affixed to its shaft for making and breaking a control circuit.

Although I have shown watthour meters in connection with my invention, it is obvious that any other similar metering instrument might be substituted therefor should it be desired to transmit and totalize the readings of meters of another type.

Each of the watthour meters 1, 2 and 3 controls a separate circuit, and since these circuits are identical, only that connected to meter 1 will be described in detail.

The watthour meter 1, by means of its commutator 4, periodically opens and closes a local circuit including a battery 5 and the coil of a relay 6, at a rate in accordance with the load on the circuit to which the watthour meter is connected.

The relay 6 when energized, moves its contact 7 to circuit-closing position to complete a circuit through a battery 8 and a condenser-charging relay 9.

The condenser-charging relay 9 is provided with contacts 10 and 11 which, when the relay is energized, operate to connect a condenser 12 to a battery 13. When the relay 9 is deenergized, the condenser 12 is connected to a fixed contact 14 of a collector switch 15 and to the coil of a relay 16 to control the operation of a totalizing relay 17 by means of its contact 18 which closes a circuit through the battery 19 and a solenoid 20 when the relay 16 is energized.

The collector switch 15 is provided with a plurality of fixed contacts similar to contact 14 to which additional impulse senders, similar to meters 1, 2 and 3, may be connected. The collector switch 15 is provided also with a rotating contact arm 21 which is driven, by any suitable means, at a speed such that the collector switch makes a complete revolution in a shorter time than that between successive closures of any of the meter circuits at their maximum loads. In this way, every impulse generated by the meter is transmitted to the totalizing apparatus without omission or duplication.

The operation of the system described in Fig. 1 will be obvious to those skilled in the art, but a brief summary thereof follows.

The rotating mechanism of the watthour meter moves at a speed proportional to the load on the conductor to which it is connected, and the commutator 4 periodically closes and operates the local circuit, including the relay 6. The operation of the relay 6 causes the relay 9 to be energized to attract its contacts 10 and 11 so that the condenser 12 is connected directly across the battery 13 to receive a charge of electricity. The local circuit is almost immediately broken by the commutator 4, and the contacts 10 and 11 of the relay 9 are, thereupon, dropped to their deenergized position to connect the condenser to the coil of relay 16 and to the fixed contact 14 of the collector switch 15.

When the fixed contact 14 is engaged by the rotating arm 21, a circuit from the condenser 12 through the relay 16 is completed, and relay 16 operates to energize the solenoid 20 by completing a circuit through the contact 18 and battery 19.

The operation of the solenoid 20 actuates a ratchet wheel 22 by means of a pawl 23. The ratchet wheel 22, in turn, operates the counter 24 by means of a shaft 25.

The receiving apparatus, comprising the relay 16, solenoid 20 and associated elements, is no part of this invention, it being old and well known in the art and being shown herein merely to make the description complete. Obviously, receiving apparatus of any other type may be substituted for that shown.

It will be obvious that, because of the relative speeds of the rotating elements of the various meters and that of the moving contact of the control switch 15, it is impossible for any meter to complete its local circuit more than once before the collector switch operates to discharge the condenser through the relay 16.

It has been observed, however, in connection with the totalizing system shown in Fig. 1 that, if the relay 9 is energized when the rotating arm 21 is in engagement with the fixed contact 14, the condenser will be charged but will not be fully discharged because of the short period of engagement of the contacts 14 and 21 after the condenser is charged. Upon further rotation of the contact arm 21, the residual charge on the condenser 12 may operate the relay 16 a second time. This duplication, of course, introduces an error into the operation of the system and, to overcome this objection, I have devised the improvement shown in Fig. 2.

The totalizing system shown in Fig. 2 is similar to that shown in Fig. 1, with the exception that additional contacts are provided on the collector switch so that, when a condenser-charging relay is energized while the rotating arm of the collector switch is in engagement with the fixed contact, the condenser-charging relay will be locked in its energizing position until the rotating arm is disengaged from the fixed contact. The condenser-charging relay is then released to connect the condenser to the fixed contact and to the totalizing relay, as in Fig. 1 and, when the contact arm again comes into engagement with the fixed contact, the entire condenser charge passes through the totalizing relay, whereby any duplication and consequent error are avoided.

Fig. 2 illustrates a totalizing system comprising four meters 26, 27, 28 and 29. These meters operate condenser-charging relays 9 which operate, in a manner described in connection with Fig. 1, to charge the condensers 12 by connecting them to a battery 13. Although the relays 9 are shown as directly connected to the meter commutator, it is obvious that a relay may be interposed between them, as shown in Fig. 1.

When the relay 9 is deenergized, the condenser 12 is connected to the totalizing relay 16 and to the fixed contact 14. The collector switch 30 is provided with an arm 31 consisting of two electrically insulated members 32 and 33. The member 32 corresponds to the arm 21 of the switch 15 of Fig. 1 and performs the same function in cooperation with contact 14. The contact 33, however, is designed to engage fixed contacts 34 and 35 to short circuit them, slightly in advance of the time at which the arm 32 engages the contact 14. The contacts 34 and 35 are connected, respectively, to the commutator 4 and to the condenser 12. In all other respects, the circuit shown in Fig. 2 is identical with that shown in Fig. 1.

The operation of the totalizer shown in Fig. 2 is the same as that of the totalizer shown in Fig. 1 except that the engagement of the contacts 34 and 35 by the rotating contacts 33 sets up a locking circuit for the relay 9 so that, if it is energized when the arm 32 is in engagement with contact 14, the contacts 10 and 11 of relay 9 will be held in their upper positions and not released to connect the condenser to the contact 14 and the relay 16 until the arm 32 has moved out of contact with the contact 14. Thus, if an impulse is received by the condenser 12 while the arm engages contact 14, a corresponding impulse is not transmitted to the relay 16 until the next revolution of the arm 32. The objection to the system shown in Fig. 1 above mentioned is thereby overcome, and an exact and accurate record of the operation of the various meters 26 to 29 is thereby obtained.

Although I have shown and described but two modifications of my invention, I realize that changes may be made by those skilled in the art and it is my intention that such changes as fall within the scope of the appended claims shall be considered as belonging to my invention.

I claim as my invention:

1. In a totalizing system, in combination, a plurality of condensers, a source of power for charging the condensers, a relay operable to connect each condenser to the power source, a collector switch having a plurality of contact elements operable to successively discharge the condensers, a holding circuit for each of the relays, and means carried by the collector switch for controlling the holding circuits, said means being disposed to prevent the discharge of any condenser more than once during a single cycle of operation of the collector switch.

2. In a totalizing system, in combination, a plurality of condensers, a relay operable in response to a predetermined condition for connecting each condenser to a charging source, a collector switch for successively effecting a discharge of the condensers, said collector switch having a rotating contact arm and a plurality of sets of fixed contact members, a holding circuit for each relay, one contact member of each set of fixed contact members being disposed, when engaged by the contact arm, to effect the discharge of its associated condenser, the other contact members of each set of fixed contact members being disposed, when engaged by said arm, to render the holding circuits of the relays effective to retain the relays in a charging position in the event they are so operated during a period when the rotating arm is in engagement with the contact members which control the discharge of the condenser.

3. In a totalizing system, in combination, a plurality of condensers, a collector switch having contact elements individual to each condenser, a plurality of relays operable when energized to connect the condensers to a charging source, said relays being disposed when in a deenergized position to connect their respective condensers through different contact elements of the collector switch to a discharge circuit, a holding circuit for each relay, said holding circuits being partially completed when the relays are energized and actuated to a charging position, and means carried by the collector switch for successively completing the holding circuits thereby to insure the occurrence of only a single discharge of each condenser for each cycle of operation of the collector switch.

4. In a control system, in combination, means for storing power, a source of power for charging the power-storing means, means for discharging the charge carried by the power-storing means, a relay for controlling the charging and discharging of the power-storing means, a holding circuit for the relay, and means carried by the discharging means for controlling the holding circuit.

5. In a control system, in combination, means for storing power, a source of power for charging the power-storing means, means for discharging the charge carried by the power-storing means, a relay for controlling the charging and discharging of the power-storing means, a holding circuit for the relay, and means carried by the discharging means for controlling the holding circuit, the said controlling means being disposed to prevent the discharge of more than one stored charge for each operation of the discharging means.

6. In a control system, in combination, means for storing power, a source of power for charging the power-storing means, means for discharging the charge carried by the power-storing means, a relay for controlling the charging and discharging of the power-storing means, a holding circuit for the relay, and means responsive to the operation of the discharging means for rendering the holding circuit effective to maintain the relay in the charging position in the event it is operated before the discharging means ceases to function, thereby to insure the release of only one stored charge for each cycle of operation of the discharging means.

7. In a totalizing system, in combination, a condenser, a source of power for charging the condenser, a switch for discharging the condenser, a relay for connecting the condenser across the power source and for cooperating with the discharging switch in discharging the condenser, a holding circuit for the relay, said holding circuit being partially completed by the relay when in a predetermined operating position, and means actuated by the discharging switch for completing said holding circuit to maintain the relay in said predetermined operating position until the discharge switch is actuated to a non-discharging position.

8. In a totalizing system, in combination, a condenser, a source of power for charging the condenser, a relay for controlling the energization of the condenser, a rotary collector switch operable to connect the condenser to a discharging circuit through the relay at predetermined intervals, a holding circuit for the relay, and an auxiliary switch actuated in accordance with the movements of the collector switch for completing said holding circuit in the event the relay is actuated to the condenser-charging position while the collector switch is in a discharging position thereby to prevent more than one condenser discharge for each cycle of operation of the collector switch.

9. In a totalizing system, in combination, a storage device, a source of power for energizing the storage device, a relay disposed when in one operating position to connect the storage device to the power source to receive a charge of electrical energy, a collector switch provided with a plurality of switch elements, said collector switch being operable to control the discharge of said storage device through one of the switch elements, a holding circuit for the relay, said collector switch being disposed to control the holding circuit through another contact element to lock the relay in a charging position in the event it is operated when the discharge controlling switch elements of the collector switch are closed.

10. In a totalizing system, the combination with a plurality of meter impulse senders and charging relays responsive to the operation of their respective impulse senders for alternately charging and connecting condensers to a totalizing device, of a collector switch operable to successively complete the connection of the charged condensers to the totalizing device, and means actuated by the collector switch for maintaining the charging relays in the condenser charging position in the event they are operated by the meter impulse sender while their respective condenser is discharging.

In testimony whereof, I have hereunto subscribed my name this fourth day of November, 1927.

GRIFFIN G. WAITE.